United States Patent Office 3,689,292

Patented Sept. 5, 1972

3,689,292

TIN IMMERSION PLATING BATH AND METHOD

John M. Preston, 7501 S. Broadway,
Carl Junction, Mo. 63111

No Drawing. Filed Dec. 7, 1970, Ser. No. 95,977
Int. Cl. C23c 3/02
U.S. Cl. 106—1 11 Claims

ABSTRACT OF THE DISCLOSURE

An electroless plating composition for immersion tin plating. This aqueous plating composition, which provides a bright adherent coating even on certain relatively high nobility substrates such as lead/tin eutectic, contains stannous chloride, fluoboric acid, thiourea, a wetting agent and a phosphorus compound selected from the group consisting of phosphoric acids having a $P_2O_5$ content of between about 72% and 82% by weight and the alkali metal salts of such acids. A preferred plating composition additionally contains a small proportion of the reaction product between phosphoric acid and a sugar. A method of electroless plating which utilizes the plating composition is also disclosed.

BACKGROUND OF THE INVENTION

This invention relates to electroless plating and, more particularly, to an improved tin immersion plating composition and method.

Methods of electrolessly plating metals onto substrates are widely known. In general, there are two basic types of processes for electroless plating. In one type of process, a reducing agent is incorporated in the plating bath solution, which, on contact of the solution with the substrate, causes metallic ions in the solution to be reduced and to deposit onto the substrate surface. In the second type of electroless plating process, metallic ions from the plating solution are reduced by the surface atoms of a metallic substrate and deposited as a layer on the surface of the substrate, from which concomitantly oxidized substrate material is displaced.

Normally, the displacement type process is effective only when the metal of the substrate is of lower nobility or higher electropositivity than the metal with which the substrate is to be plated. Thus, metals such as steel or aluminum may be plated with tin from solutions of stannous sulfate or stannous chloride. Though it is often desirable to plate a metal of higher nobility with another metal of lower nobility because of the particular properties which the latter metal may possess, this result is difficult to accomplish because of the normal absence of an electrochemical driving force which will produce it.

For example, in the preparation of printed circuits whose conductive elements consist of solder plate metal, a lead/tin eutectic mixture, it is desirable to apply a tin coating to the solder plate in order to avoid oxidation and discoloration of the circuit elements. Since lead is a metal of higher nobility than tin, however, a situation is presented in which displacement type electroless plating is normally inhibited by the absence of a favorable electrochemical driving force.

Electroless plating compositions are known which incorporate various acids and thiourea to effectively lessen the nobility of a substrate that is normally more electronegative than tin, and allow displacement type plating of tin thereon. The solutions which have, heretofore, been used for such purposes, however, have not uniformly provided a tin coating of high lustre which is strongly adherent to the substrate. Moreover, various process problems have been encountered in the use of such compositions which have contributed to low productivity, excessive costs and hazardous operating conditions. Thus, for example, high concentrations of tin have commonly been required in such solutions and the baths have not generally been susceptible to replenishment. This has resulted in both excessive usage of expensive tin salts and in high down-time requirements to allow changing of the tinning bath. Plating rates have been relatively slow, 5 minutes immersion being typically required to produce a coating of adequate thickness over the entire area of a substrate such as a solder plate printed circuit. High temperatures, for example 170° F. to 175° F., have often been required, promoting the release of obnoxious fumes from the bath and preventing the use of certain low cost plastic materials of construction for the plating tank. In some of the prior art baths, an excessive rate of decomposition of thiourea has also been experienced, generating very obnoxious and deadly hydrogen sulfide gas.

There has thus been an unfulfilled need in the art for an electroless tin plating bath which rapidly produces an adherent, high lustre tin plate on substrates such as lead or lead/tin alloy, at low temperature, without the generation of noxious fumes, and which is subject to ready replenishment without the necessity of substantial down-time.

SUMMARY OF THE INVENTION

Among the several objects of the present invention, therefore, may be noted the provision of a process for electroless plating of tin on such substrates as lead and lead/tin alloys; the provision of such a process whereby a lustrous, adherent coating of tin plate is provided; the provision of such a process which provides high production rates and minimum costs; the provision of such a process which may be conducted at low temperatures; the provision of such a process which avoids the generation of noxious fumes; and the provision of a novel plating bath composition useful in the practice of such a process. Other objects will be in part apparent and in part pointed out hereinafter.

Briefly, the present invention is directed to a composition useful as an electroless tin plating bath comprising an aqueous solution containing stannous chloride, thiourea, fluoboric acid, a wetting agent and a phosphorus compound selected from the group consisting of phosphoric acids having a $P_2O_5$ content of between about 72% and 82% by weight and the alkali metal salts of such acids. The invention is further directed to such a composition which additionally contains the reaction product of phosphoric acid with a sugar selected from the group consisting of sucrose, fructose, maltose, lactose, mannose and glucose. The invention also includes a process for electroless tin plating. The process comprises the steps of: preparing a plating bath comprising an aqueous solution containing stannous chloride, thiourea, fluoboric acid, a wetting agent and a phosphorus compound selected from the group consisting of phosphoric acids having a $P_2O_5$ content of between about 72% and 82% by weight and the alkali metal salts of said acids; heating said plating bath to a temperature not less than about 130° F.; contacting a metallic substrate with said plating solution for a time sufficient to produce a coating of tin plate on said substrate; removing the plated substrate from contact with said plating solution; and rinsing any residual plating solution from the plated surface.

DESCRIPTION OF THE PREFERRED EMBODIMENTS

In accordance with the process of the present invention, an adherent coating of tin may be provided on the surface of a substrate such as lead or a lead/tin alloy. The process is operated at low temperature, thus generating a minimum of obnoxious fumes, and the operations of the process may be conducted in a low-cost vessel such as, for example, a tank fabricated from an inexpensive plastic. Though the concentration of tin salt in the plating bath is relatively low, a high rate of tinning may be realized, thus providing high productivity. Since the bath may be replenished almost indefinitely, down-time requirements are minimal. Ability to replenish the bath, in conjunction with the minimum drag out losses which result from the use of low tin salt concentrations, provide high tin yields. High productivity, low down-time and high yields contribute to superior cost performance where my process is used. Furthermore, decomposition of thiourea is suppressed in my process and the generation of deadly hydrogen sulfide gas is avoided.

In the practice of the present invention, the novel plating composition of the invention is initially prepared by mixing stannous chloride, fluoboric acid, thiourea, a wetting agent and a phosphorus compound of the type described hereinbelow, with water. The order of addition is not critical but a particularly convenient and preferred method of preparing the bath is as follows: A suitable vessel, such as a plastic tank, is filled to its operating level with hot water. The required proportion of fluoboric acid is then added with stirring, after which the wetting agent is added while stirring is continued. The thiourea is added to the solution of fluoboric acid and wetting agent and the resulting slurry is agitated until the thiourea is fully dissolved. If the plating tank is not equipped with an agitator adapted for dissolving solids, it may be convenient to remove a portion of the fluorboric acid/wetting agent solution from the tank and dissolve the thiourea in said portion in a separate vessel, after which the resulting concentrated thiourea solution is added back to the plating tank. After the thiourea has been incorporated in the overall solution, the stannous chloride is added. Lastly, the phosphorus compound is added. The bath is preferably heated to about 140° F. prior to the addition of the phosphorus compound.

To carry out plating operations, the bath is brought to a temperature of not less than about 130° F. and the substrate, such as a solder plate printed circuit, is contacted therewith, as by immersion therein. Plating proceeds rapidly and an adherent coating of tin is produced on the plate within a relatively short time, for example, about 2½ minutes. The substrate is then removed from contact with the plating bath and rinsed to remove any residual plating solution.

During plating operations, the plating composition is preferably maintained between a temperature of about 130° F. and 145° F. Higher temperatures may be employed but are unnecessary. At temperatures below 130° F. plating occurs, but at an undesirably slow rate with the formation of relatively large crystal structures in the tin plate.

Stannous chloride, thiourea and fluoboric acid are each essential components of the plating composition of this invention. Stannous chloride is the only tin salt which has been found to consistently produce the bright, adherent coating desired, while meeting the productivity and cost goals set forth above. Thiourea and fluobric acid combine to reduce the effective nobility of such metals as lead in the substrate and to allow displacement of such metals by tin reduced from the solution. The plating composition may contain from about 0.30% to about 0.36% by weight stannous chloride, between about 1.11% and 1.35% by weight of fluoboric acid and between about 0.99% and about 1.11% by weight thiourea. A preferred bath contains about 0.33% by weight stannous chloride, about 1.23% by weight fluoboric acid and about 1.10% by weight thiourea.

The phosphorus compound contained in the composition of this invention ties up undesirable ions, such as $Ca^{++}$, $Fe^{++}$, $Mg^{++}$ and $Mn^{++}$, thereby preventing the interference of such ions with the plating operation and insuring the formation of a finer grain tin matrix. Plating constituted by a fine grain matrix is especially bright and adherent. Sequestering of the above-noted undesirable ions also prevents poisoning of the bath and substantially prolongs bath life, thereby further contributing to the high yields, low down-time and low plating costs associated with the process of this invention. The preferred phosphorus compound is pyrophosphoric acid but any phosphoric acid having a $P_2O_5$ content of between about 72% and about 82% by weight may also be used, as may alkali metal salts of such acids. The latter compounds may be conveniently prepared by concentrating a phosphoric acid solution to 65% by weight $P_2O_5$, neutralizing or partially neutralizing it with an alkaline solution (e.g., NaOH) while maintaining the solution temperature below about 150° F. and then concentrating the resultant salt solution to an equivalent 72% or more by weight $P_2O_5$.

When tap water is used in preparing the plating solution, the phosphorus compound should represent at least about 0.35% by weight of the solution. However, when distilled or deionized water is used the proportion of phosphorus compound may be as low as 0.004% by weight. In relatively highly contaminated systems as much as 1% by weight of the phosphorus compound may be required. Even somewhat higher proportions may be used without adverse effect but are normally unnecessary.

A wide variety of surfactants may be used as the wetting agent in the plating bath of this invention. A particularly suitable and preferred wetting agent is the octyl phenyl ether of a polyethylene glycol containing 9–10 ethoxy groups per molecule (such as that sold under the trade designation "Triton X–100" by Rohm & Haas Company). Other alkyl phenyl alkoxy or other types of nonionized surfactants may be conveniently used, as may ionized surfactants such as alkali metal salts of long-chain carboxylic or sulfonic acids, alkyl aryl sulfonates and alkali metal salts thereof, and alkali metal salts of monoglyceride monosulfates. The plating solution should contain about 0.1% to 0.3% by weight, preferably about 0.2% by weight, of the wetting agent.

In an optional but highly preferred embodiment of this invention, the plating composition contains the reaction product between phosphoric acid and a sugar. Though the mechanism is not fully understood, this reaction product cooperates with the phosphorus compound in producing a fine pebble like structure in the tin plate. Plating having such a structure exhibits significantly greater lustre and adherence than does plating prepared by processes of the prior art, which is commonly constituted by relatively large overlapping lamellae.

The amount of sugar required to produce the proper proportion of phosphoric acid/sugar reaction product for the plating bath is between about 0.19 and about 20.5, preferably 3.7 to 4.1, parts per 100 parts phosphorus compound in the bath. A mixture containing 72%–82% by weight of $P_2O_5$ along with the reaction product of a sugar and phosphoric acid is conveniently prepared by adding a small proportion of sugar to an orthophosphoric acid solution and then boiling the solution. Boiling the solution effectuates reaction between the sugar and phosphoric acid while concentrating the solution to the desired $P_2O_5$ content. The initial orthophosphoric acid/sugar mixture should contain between about 0.15 and 18, preferably about 3.7, parts by weight sugar per 100 parts by weight $P_2O_5$ in the orthophosphoric acid. The acid/sugar mixture is boiled until it has been concentrated in the above-noted $P_2O_5$ content. (When the concentrating operation is carried out in a Pyrex vessel it has been observed that the concentrate also contains about 2% by weight boron.) The solution containing the acid/sugar reaction product is then added to the plating bath.

A wide range of both monosaccharide and disaccharide sugers can be reacted with phosphoric acid to produce the reaction product preferably contained in the plating bath of this invention. Sucrose is preferred because it is both highly effective and readily available at low cost. However, other sugars such as maltose, glucose, fructose, lactose, and mannose are also useful.

The following examples illustrate the invention.

Example 1

Approximately 97 gallons of hot water were charged to a mixing tank. Two gallons of 48% fluoboric acid and 0.2 gallon of a surfactant sold under the trade designation "Triton X-100" were then added and thoroughly mixed with the water charge. A 5 gallon aliquot of the resulting solution was removed from the tank and 10 pounds of thiourea was added to this 5 gallon portion. The resulting mixture was agitated until all of the thiourea was dissolved and the concentrated thiourea solution thus produced was added back into the mixing tank. Three pounds of stannous chloride were then added to the solution in the tank. This solution was then heated to 140° F. and 0.5 pound of pyrophosphoric acid were added.

Into the bath thus produced, a printed circuit of solder plate (a 63% tin, 47% lead eutectic) was introduced. The circuit board was immersed for a period of 2½ minutes, then removed from the bath and rinsed. A bright adherent tin coating was produced on all solder plate surfaces of the printed circuit.

Example 2

An electroless plating bath was prepared in the manner described in Example 1 except that 0.5 lb. of 79% by weight $P_2O_5$ solution containing the reaction product between phosphoric acid and sucrose was used in place of pyrophosphoric acid in the bath. This solution was prepared by boiling a solution which initially contained 54% by weight $H_3PO_4$ and 2% by weight sucrose until it was concentrated to 79% by weight $P_2O_5$. The concentrated solution was cooled to 77° F. and added to the plating bath.

Using this bath, repeated plating operations were conducted for a period of approximately six months with stannous chloride being added periodically to maintain the strength of stannous ion in the solution. Bright adherent coatings of tin plate were consistently obtained.

Example 3

An electroless tin plating composition was prepared in the manner described in Example 1, except that 0.5 lb. of a 75% by weight $P_2O_5$ solution containing the reaction product between phosphoric acid and maltose was used in place of pyrophosphoric acid. This solution was prepared by boiling a solution which initially contained 2% by weight maltose and 54% by weight phosphoric acid until it was concentrated to 75% by weight $P_2O_5$. The concentrated solution was cooled and added to the plating bath.

In repeated plating operations, the use of this bath provided bright adherent coatings of tin plate over an extended period of time.

Example 4

An electroless tin plating composition was prepared in the manner described in Example 1, except that a 0.5 lb. of 75% by weight $P_2O_5$ solution containing the reaction product between phosphoric acid and fructose was used in place of pyrophosphoric acid. This solution was prepared by boiling a solution which initially contained 2% by weight fructose and 54% by weight phosphoric acid until it was concentrated to 77% by weight $P_2O_5$. The concentrated solution was cooled and added to the plating bath.

In repeated plating operations the use of this bath provided bright adherent coatings of tin plate over an extended period of time.

Example 5

An electroless tin plating composition was prepared in the manner described in Example 1, except that 0.5 lb. of a 75% by weight $P_2O_5$ solution containing the reaction product between phosphoric acid and d-galactose was used in place of pyrophosphoric acid. This solution was prepared by boiling a solution which initially contained 2% by weight d-galactose and 54% by weight phosphoric acid until it was concentrated to 72% by weight $P_2O_5$. The concentrated solution was cooled and added to the plating bath.

In repeated plating operations the use of this bath provided bright adherent coatings of tin plate over an extended period of time.

In view of the above, it will be seen that the several objects of the invention are achieved and other advantageous results attained.

As various changes could be made in the above methods and products without departing from the scope of the invention, it is intended that all matter contained in the above description shall be interpreted as illustrative and not in a limiting sense.

What is claimed is:

1. A composition useful as an electroless tin plating bath comprising an aqueous solution containing between about 0.30% and about 0.36% by weight stannous chloride, between about 1.11% and about 1.35% by weight fluoboric acid, between about 0.1% and about 0.3% by weight of a wetting agent, between about 0.99% and about 1.11% by weight thiourea, and at least about 0.004% by weight of a phosphorous compound selected from the group consisting of phosphoric acids having a $P_2O_5$ content of between about 72% and 82% by weight and the alkali metal salts of said acids.

2. A composition as set forth in claim 1 wherein said plating bath further comprises the reaction product of phosphoric acid with a sugar selected from the group consisting of sucrose, fructose, maltose, lactose, mannose, and glucose, said reaction product corresponding to that obtained when a solution containing o-phosphoric acid and said sugar is boiled.

3. A composition as set forth in claim 2 wherein the solution containing o-phosphoric acid and sugar is boiled sufficiently to concentrate the $P_2O_5$ content of said solution to a concentration of between about 72% and 82% by weight.

4. A composition as set forth in claim 2 which additionally contains the reaction product of phosphoric acid with between about 0.19 and 20.5 parts of a sugar selected from the group consisting of sucrose, fructose, maltose, lactose, mannose and glucose per 100 parts of the phosphorus compound present in said composition.

5. A process for electroless tin plating which comprises:

(a) preparing a plating bath comprising an aqueous solution containing between about 0.30% and about 0.36% by weight stannous chloride, between about 1.11% and about 1.35% by weight fluoboric acid, between about 0.1% and about 0.3% by weight of a wetting agent, between about 0.99% and about 1.11% by weight thiourea, and at least about 0.004% by weight of a phosphorus compound selected from the group consisting of phosphoric acids having a $P_2O_5$ content of between about 72% and 82% by weight and the alkali metal salts of said acids;

(b) heating said plating bath to a temperature not less than about 130° F.;

(c) contacting a metallic substrate with said plating solution for a time sufficient to produce a coating of tin plate on said substrate;

(d) removing the plated substrate from contact with said plating solution; and (e) rinsing any residual plating solution from the plated surface.

6. A method as set forth in claim 5 wherein said plating bath further comprises the reaction product of phosphoric acid with a sugar selected from the group consisting of sucrose, fructose, maltose, lactose, mannose and glucose, said reaction product corresponding to that obtained when a solution containing o-phosphoric acid and said sugar is boiled.

7. A method as set forth in claim 6 wherein the solution containing o-phosphoric acid and sugar is boiled sufficiently to concentrate the $P_2O_5$ content of said solution to a concentration of between about 72% and 82% by weight.

8. The method set forth in claim 6 wherein the said plating solution additionally contains the reaction product of phosphoric acid with between about 0.19 and 20.5 parts of a sugar selected from the group consisting of sucrose, fructose, maltose, lactose, mannose and glucose per 100 parts phosphorus compound present in said composition.

9. The method set forth in claim 5 wherein the substrate contains lead.

10. The method set forth in claim 5 wherein the substrate contains lead and tin.

11. The method set forth in claim 5 wherein the substrate is a eutectic mixture of lead and tin.

References Cited

UNITED STATES PATENTS

| | | | |
|---|---|---|---|
| 2,369,620 | 2/1945 | Sullivan et al. | 117—130 R |
| 2,891,871 | 6/1959 | Ceresa et al. | 106—1 |
| 3,303,029 | 2/1967 | Shipley | 106—1 |
| 3,305,389 | 2/1967 | Lowenheim et al. | 106—1 X |

OTHER REFERENCES

Narcus, H.: "The Role of Chelating Agents in the Plating Industry," Metal Finishing, March 1962, pp. 54–62.

LORENZO B. HAYES, Primary Examiner

U.S. Cl. X.R.

117—130 E